Patented July 5, 1932

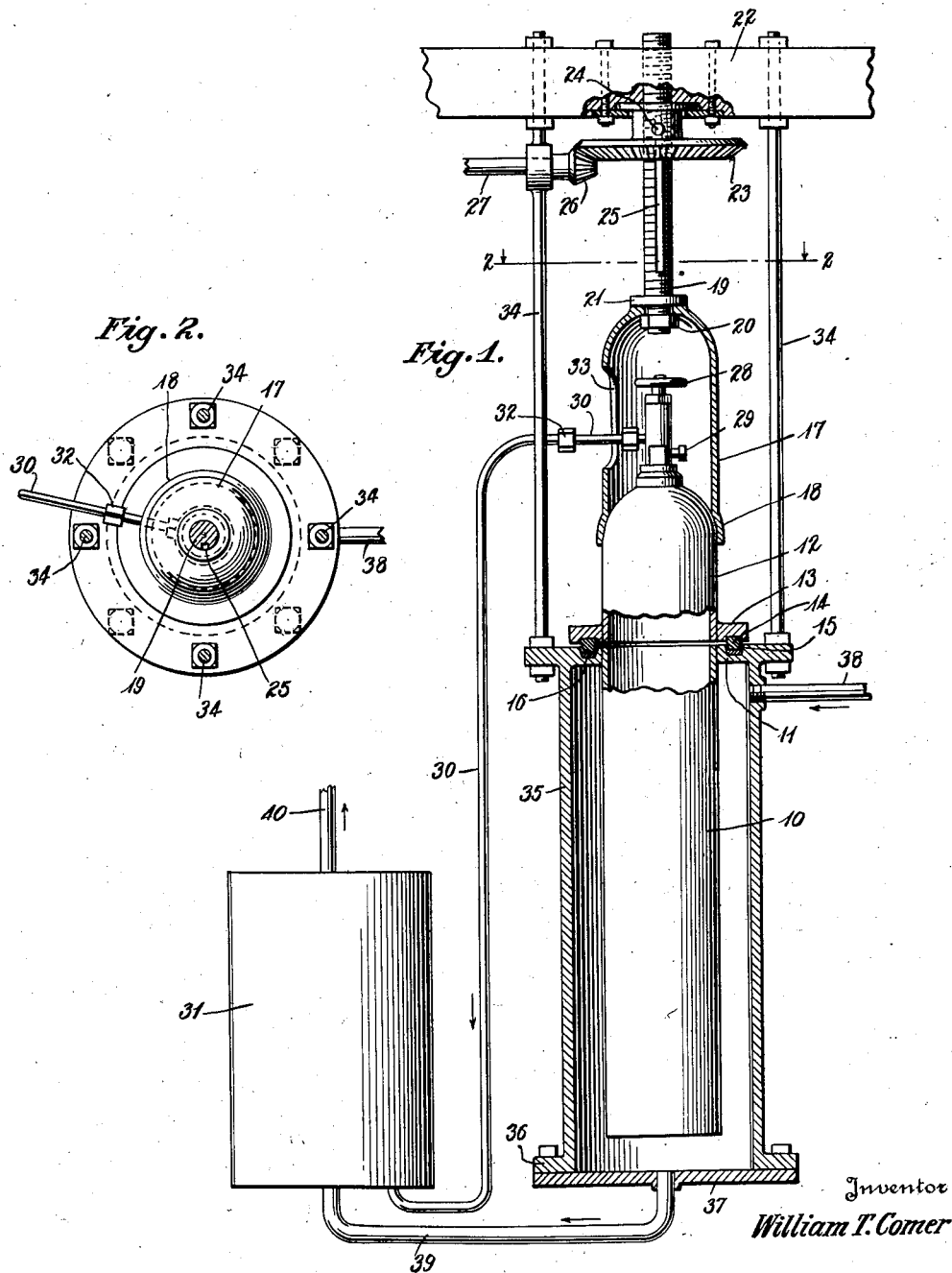

1,866,192

UNITED STATES PATENT OFFICE

WILLIAM T. COMER, OF ATLANTA, GEORGIA, ASSIGNOR TO CRYSTAL CARBONIC LABORATORY OF ATLANTA, GEORGIA, A CORPORATION OF GEORGIA

CARBONATING CYLINDER AND SYSTEM FOR USE OF SOLID $CO_2$

Application filed January 18, 1930. Serial No. 421,856.

The invention relates to carbonating devices and has as an object the provision of a cylinder designed to contain carbon dioxide under pressure for supply to a carbonator for use in the preparation of beverages, which cylinder may be charged with solid carbon dioxide.

It is a further object of the invention to provide a cylinder of the type described having a cap which may be readily removed when the cylinder is to be charged with solid carbon dioxide and which may be as readily returned to place and pressed into gas-tight contact with the cylinder after the latter has been charged.

It is a further object of the invention to provide a cylinder of the type referred to having a water jacket to supply sufficient heat to vaporize the solid carbon dioxide and produce pressure within the cylinder.

It is a further object of the invention to provide a cylinder and water jacket as described having means to supply a carbonator with water from the water jacket.

Further objects of the invention will appear from the following description when read in connection with the accompanying drawing showing an illustrative embodiment of the invention, and wherein:—

Fig. 1 is a side elevation partly in central vertical section; and

Fig. 2 is a horizontal section on line 2—2 of Fig. 1.

As shown the device comprises a pressure cylinder 10 open at its upper end and otherwise completely closed, the open end being surrounded by a flange 11. To close the opening there is shown a cap 12 provided with a flange 13. To provide a gas-tight joint between the cap and cylinder the flange 13 is shown as provided with an annular rib 14 seating in a groove 15 in the flange 11, a gasket as of lead 16 being desirably provided to seal the joint. To press the cap against the flange of the cylinder, there is shown a yoke 17 desirably formed as a dome electrically welded at 18 to the cap 12. A screw 19 is shown passing through an opening in the apex of the yoke 17 and retained in revoluble relation to the yoke as by means of a nut 20 fixed upon the end of the screw, a collar 21 also fixed upon the screw being shown to place pressure upon the yoke 17. The screw 19, nut 20, and collar 21 are freely revoluble with respect to the yoke 17. The yoke 17 may be caused to press upon the flange 11 or may be lifted away from the cylinder by revolution of the screw 19 in threaded engagement with the support 22.

To revolve the screw 19 there is shown a bevel gear 23 having a pin or feather 24 traveling in a slot 25 in the screw 19. The gear 23 is shown as in mesh with a pinion 26 carried by shaft 27 which may be revolved in any desired manner as by a hand wheel or crank not shown.

The cap 12 is shown as provided with a safety valve having an adjusting element 28 and a vent 29 and also as provided with a pipe 30 leading to a carbonator 31 of any usual form, a union 32 being shown which may be disconnected when the cap is to be lifted for charging of the cylinder 10 with carbon dioxide ice.

The pipe 30 is shown as entering the yoke 17 through an opening 33 through which also access to the adjusting wheel 28 of the safety valve may be had.

To react against the pressure of the screw 19 upon the cap 12, the flange 11 is shown as secured to the member 22 by means of tension rods 34. The entire device with the exception of the carbonator 31 may be suspended from these rods, if desired.

To supply heat to the cylinder 10 for vaporization of the solid carbon dioxide therein, there is shown a water jacket 35 which may be integral at its upper portion with the flange 18 and is shown as formed with a bottom flange 36 to which is secured a bottom closure 37. Water may be conducted to the jacket 35 through a pipe 38 which may be connected with a city water supply. The water in the jacket 35 giving up its heat to the cylinder 10 will become cooled to a low temperature and to utilize this cold water as a supply to the carbonator 31 there is shown a pipe 39 leading from the bottom of jacket 35 to the bottom of the carbonator.

Carbonated water produced by the charging of water from the jacket 35 in the carbonator 31 with $CO_2$ gas supplied from the cylinder 10 through the pipe 30 may be drawn off for use as at a soda fountain through pipe 40.

By the provision of the invention the shipping of carbon dioxide cylinders by express is entirely done away with as well as the provision of the large number of such cylinders which is now required as part of the property necessary to supply soda fountains with carbonated drinks. Each fountain may be supplied with one of the cylinders 10, as shown in Fig. 1, and carbon dioxide ice may be supplied to the fountain in a well-known manner. The attendant may disconnect the union 32 and lift the cap 12 and drop the carbon dioxide ice into the cylinder 10 and then restore the parts, all of which may be done in a few minutes, when a large supply of carbon dioxide gas is available for use in the carbonator and in addition the system also supplies an ample quantity of water at a low temperature to the carbonator.

Minor changes may be made in the physical embodiment of the invention within the scope of the appended claims without departing from the spirit of the invention.

I claim:

1. A pressure cylinder for carbonators comprising, in combination, a cylinder for reception of solid $CO_2$, a cap for said cylinder, screw means revolubly connected to said cap, said means acting to press said cap into gas-tight contact with said cylinder and to move said cap into spaced relation to said cylinder in accordance with its direction of revolution.

2. A pressure cylinder for carbonators comprising, in combination, a cylinder open at one end, an annular flange surrounding said opening, a support spaced from said opening, a cap for said opening, a screw having threaded engagement with said support and revolubly connected to said cap, means to revolve said screw, revolution of said screw in one direction acting to move said cap into spaced relation to said opening and in the opposite direction acting to press said cap into gas-tight contact with said flange, and tension members connected to said flange and support to react against said pressure.

3. A pressure cylinder for carbonators comprising, in combination, a cylinder open at one end, a flange surrounding said opening, a cap for said cylinder, a flange carried by said cap to contact with said first named flange, a support, a screw having threaded engagement with said support, revolubly connected with said cap and having a key way, tension members connected with said first named flange and with said support, a gear revolubly carried by said support and having threaded engagement with said screw, means fixedly carried by said gear and slidably in said key way and a pinion for causing revolution of said gear.

4. A carbonating system comprising, in combination, a cylinder for reception of solid $CO_2$, a cap freely removable into spaced relation with said cylinder to permit charging thereof, means to press said cap into gas-tight contact with said cylinder, a water jacket surrounding said cylinder whereby to supply heat to vaporize $CO_2$ with which said cylinder is charged, a carbonator, means to conduct $CO_2$ gas from said cylinder and means to conduct water from said jacket to said carbonator.

5. A carbonating system comprising, in combination, a cylinder for reception of solid $CO_2$, a cap for said cylinder, means to move said cap into spaced relation with said cylinder to permit charging the same and upon reversal of movement to press said cap into gas-tight contact with said cylinder, a closed water jacket surrounding said cylinder, means to conduct water under pressure to said jacket to supply heat for vaporizing $CO_2$ in the cylinder, a carbonator, $CO_2$ gas conducting means between said cylinder and carbonator and means to conduct cooled water from said jacket to said carbonator.

WILLIAM T. COMER.